(12) United States Patent
Nilsson et al.

(10) Patent No.: US 7,346,126 B2
(45) Date of Patent: Mar. 18, 2008

(54) METHOD AND APPARATUS FOR CHANNEL ESTIMATION USING PLURAL CHANNELS

(75) Inventors: Johan Nilsson, Malmö (SE); Håkan Eriksson, Tyresö (SE); Bo Bernhardsson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1198 days.

(21) Appl. No.: 09/996,513

(22) Filed: Nov. 28, 2001

(65) Prior Publication Data

US 2003/0099306 A1    May 29, 2003

(51) Int. Cl.
    *H04L 27/06* (2006.01)
(52) U.S. Cl. .................. 375/316; 375/148
(58) Field of Classification Search ............. 375/224, 375/226, 130, 140, 147, 316, 317, 318, 377, 375/345; 455/232.1, 239, 130, 235.1, 233.1, 455/250.1, 230
    See application file for complete search history.

(56) References Cited

U.S. PATENT DOCUMENTS

| | | | |
|---|---|---|---|
| 5,191,598 A | | 3/1993 | Bäckström et al. |
| 5,255,202 A | * | 10/1993 | Kido et al. ............. 702/190 |
| 5,267,261 A | | 11/1993 | Blakeney et al. |
| 5,581,580 A | * | 12/1996 | Lindbom et al. ........... 375/340 |
| 5,583,886 A | | 12/1996 | Rohani et al. |
| 5,680,419 A | | 10/1997 | Bottomley |
| 5,822,380 A | | 10/1998 | Bottomley |
| 5,999,802 A | * | 12/1999 | Aschwanden ........... 455/196.1 |
| 6,560,299 B1 | * | 5/2003 | Strolle et al. ............. 375/347 |
| 6,700,537 B2 | * | 3/2004 | Dufour et al. ............. 342/418 |
| 6,754,473 B1 | * | 6/2004 | Choi et al. ................ 455/101 |

FOREIGN PATENT DOCUMENTS

| | | |
|---|---|---|
| EP | 0 955 741 A1 | 11/1999 |
| EP | 1 089 458 A2 | 4/2001 |
| EP | 1 191 713 A1 | 3/2002 |
| JP | 05172694 | 1/1995 |
| JP | 08214496 | 2/1998 |
| JP | 09009794 | 8/1998 |
| WO | 98 47240 A1 | 10/1998 |
| WO | 99 05833 A1 | 2/1999 |
| WO | 99 22454 A2 | 5/1999 |
| WO | 00 11805 A1 | 3/2000 |
| WO | 00 14896 A1 | 3/2000 |
| WO | 01 89115 A | 11/2001 |

OTHER PUBLICATIONS

U.S. Appl. No. 09/573,157, filed May 19, 2000, Nilsson.
Proakis, John G., "Digital Signaling over a Bandwidth-Constrained Linear Filter Channel, 6.7.2 An Adaptive Channel Estimator", *Digital Communication, Second Edition*, 1989, pp. 624-627.

(Continued)

*Primary Examiner*—Temesghen Ghebretinsae
(74) *Attorney, Agent, or Firm*—Potomac Patent Group PLLC

(57) ABSTRACT

Methods and apparatus are described for estimating a gain offset between two channels in a communication system. The gain offset arises from the system's transmission of signals on the two channels at different powers. The estimated gain offset is used for determining a set of complex channel estimates.

28 Claims, 7 Drawing Sheets

OTHER PUBLICATIONS

3rd Generation Partnership Project (3GPP); Technical Specification Group Radio Access Network; Physical channels and mapping of transport channels onto physical channels (FDD), 3 G TS 25.211 version 3.3.0, Release 1999, pp. 2-42.

3rd Generation Partnership Project (3GPP); Technical Specification Group Radio Access Network; Physical layer procedures (FDD), 3 G TS 25.214 version 3.3.0, Release 1999, pp. 2-44.

J.H. Winters, "Signal Acquisition and Tracking with Adaptive Arrays in the Digital Mobile Radio System IS-54 with Flat Fading", IEEE Trans. Veh. Technol., vol. 42, pp. 377-384 (Nov. 1993).

Hoon, Kim et al. "An efficient Channel estimation Scheme for Downlink in WCDMA/FDD Systems" Database Inspec "Online!", Institute of Electrical Engineers, Stevenage, GB & IEEE 54th Vehicular Technology Conference, VTC Fall Oct. 2001.

3rd Generation Partnership Project (3GPP); Universal Mobile Telecommunications Systems (UMTS); Physical Layer Procedure (FDD); 3GPP TS 25.214 version 3.4.0, Release 1999, pp. 1-48.

* cited by examiner

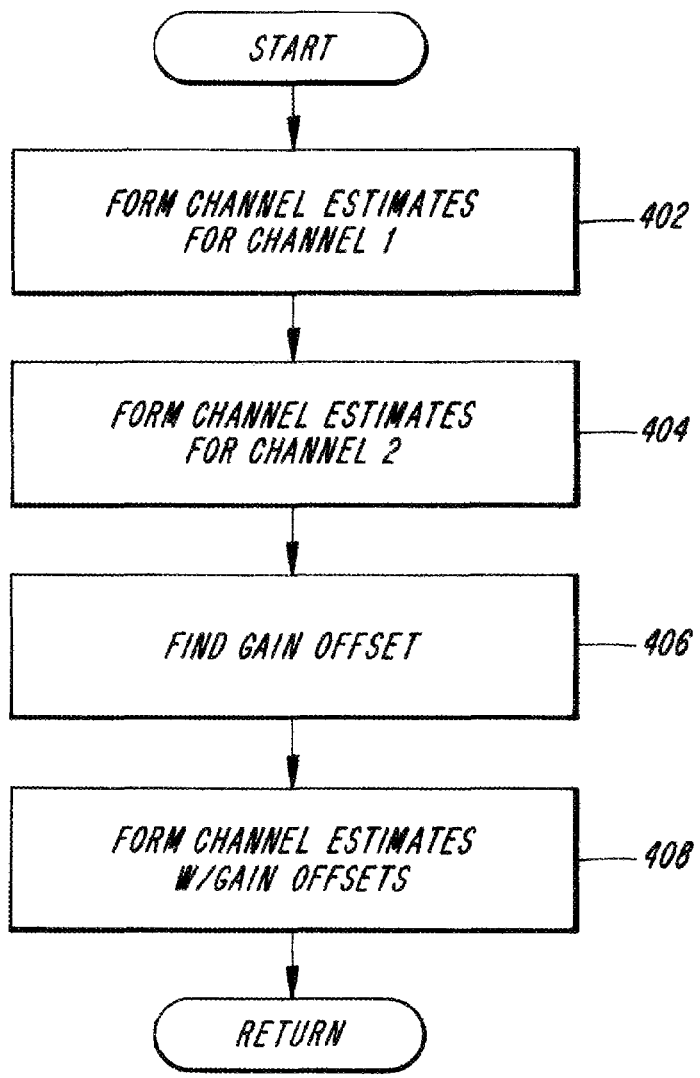
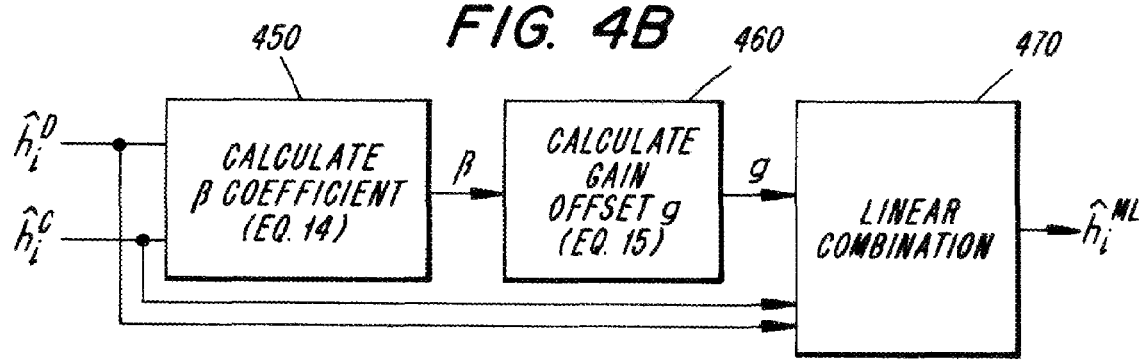

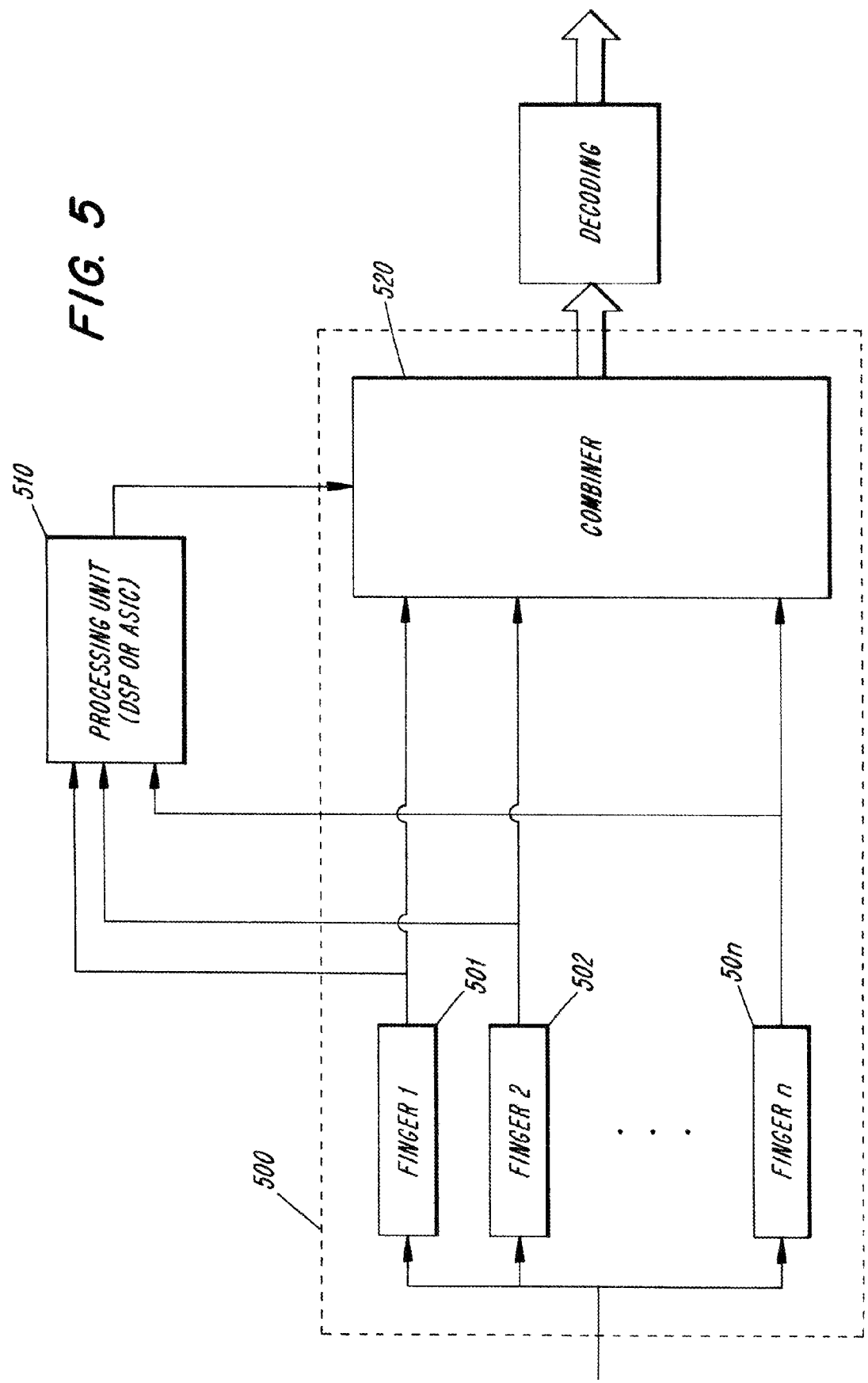

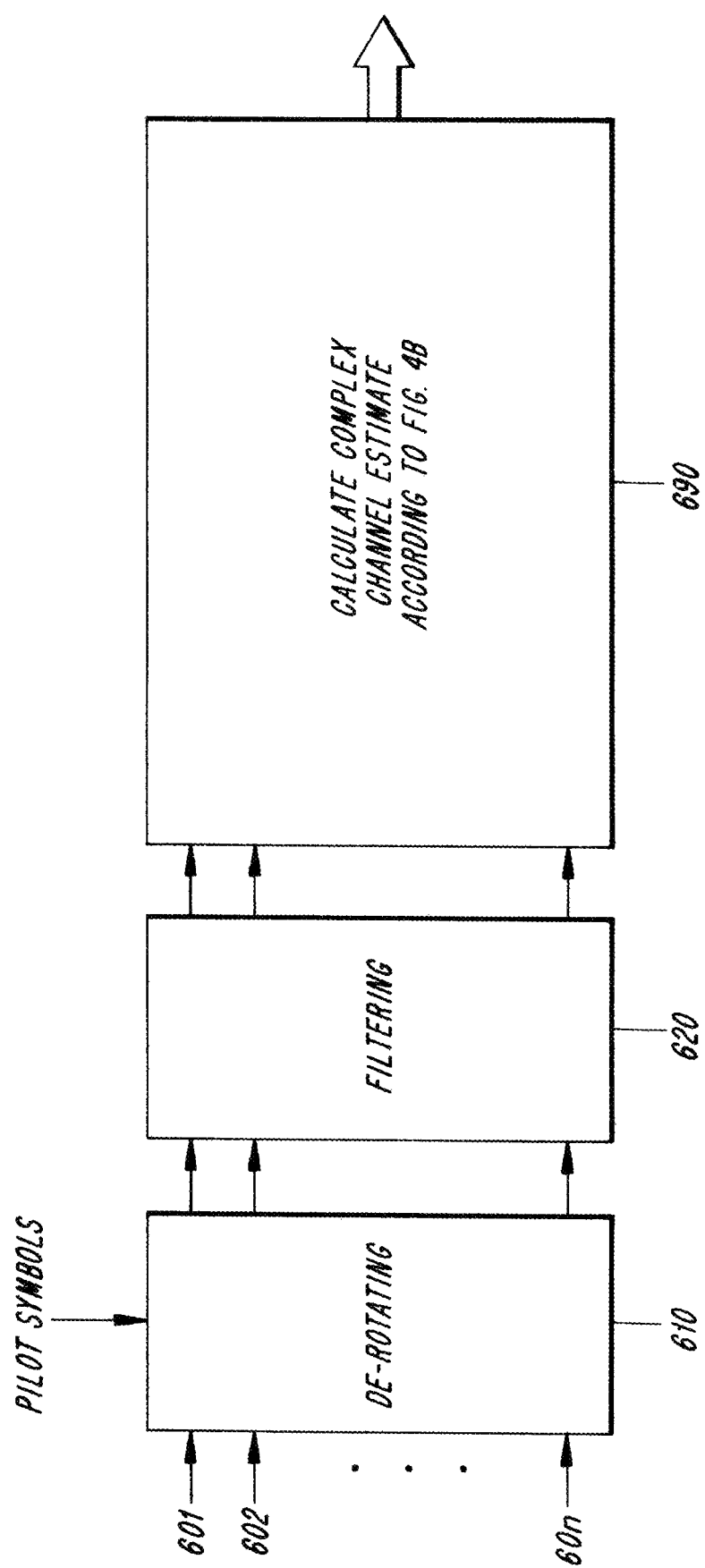

METHOD AND APPARATUS FOR CHANNEL ESTIMATION USING PLURAL CHANNELS

BACKGROUND

This invention relates to channel estimation in a receiver and more particularly to channel estimation based on at least two signals, one of which may be a pilot signal.

In a digital communication system, digital symbols representing information are transmitted between different nodes (e.g., base stations, mobile phones) to exchange information.

A layered model often referred to as the OSI (Open System Interconnection) model is often used to describe communication systems. The lowest layer in that model, where information streams consisting of bits are transmitted, is often referred to as the physical channel. A physical channel provides services with a pre-defined quality, depending on the arrangement. In a simplified description, a physical channel includes the formatting of bits in a pre-defined format, coding, interleaving, modulation of a carrier, transmission over a medium, down-conversion, demodulation, de-interleaving, and forward error correction. In addition, there are many other functions that are required for proper operation, such as synchronization in both time and frequency and channel estimation. Pilot symbols are often transmitted among information symbols on the physical channels. These pilot symbols are then used in the receiver to obtain synchronization and channel estimates. The channel estimates describe how the transmitted symbols are affected by the channel (including the modulation, TX front-end, medium, RX front-end, and demodulator) and are used to reconstruct the signal in the receiver.

Physical channels can be of two types, dedicated physical channels and broadcast channels. Dedicated physical channels are transmitted to one receiver while broadcast physical channels are intended for multiple receivers.

The medium carries the electromagnetic or optical signal between the antennas of the different nodes. In radio communication systems the medium consists of "free-space" (which is not free) and the signal is electromagnetic waves propagating in this medium. Reflections due to buildings and other obstacles, result in fading and dispersion. Dispersion may cause multi-path depending on the symbol rate on the physical channel and the severity of the dispersion.

A base station most often transmits multiple physical channels. In TDMA systems, physical channels from the same base station are separated using time (and frequency if multiple carriers are used). In FDMA systems only frequency is used to separate different physical channels. In spread spectrum CDMA systems, codes are used to separate different users (and frequency if multiple carriers are used).

In a WCDMA system, the common physical pilot channel (CPICH) and the pilots transmitted in the dedicated physical channel (DPCH) that are transmitted from the same base station may be transmitted using the same front-end and the same antenna at the base station. Then, these two channels experience the same medium response and thus channel estimates based on the CPICH and DPCH are both useful for providing a good estimate of the channel coefficients. This is not the case when the CPICH and the DPCH are transmitted using two different antennas.

Regardless of the channel used, a received signal differs from the transmitted signal in various ways due to the effects of passing through the transmission medium. In a medium, such effects on a radio-frequency signal primarily include multipath fading, interference from other signals passing through the medium, and thermal noise. Fading is caused by the interaction of the signal with reflections or echoes of itself, and may result in large and highly localized amplitude and phase shifts of the signal, known as Rayleigh fading. In a radio environment, interference is often caused by the unwanted presence of other radio signals. These other signals may be using the same channel as the desired signal (sometimes called co-channel interference) or using an adjacent channel (sometimes called adjacent channel interference). Thermal noise is present in all communication channels, and causes additional distortion of the transmitted signal. The signal received at the receiver can therefore be thought of as a composite signal consisting of a desired component and an impairment component. The impairment component represents the effects of passage through the medium, e.g., interference and noise.

At the receiver, a received signal is processed to obtain a sequence or stream of digital samples, called here "received samples" or a "received sample stream", and these samples may be represented as complex numbers. For example, the received signal may be filtered, amplified, and mixed down to baseband using in-phase and quadrature local oscillators, and after analog-to-digital (A/D) conversion and synchronization processing, a stream of complex received samples $r(n)$ is obtained. Each sample in the complex sample stream $r(n)$ may be represented as a sum of a real component and an imaginary component, that is, $r(n)=I(n)+jQ(n)$, where $I(n)$ represents the in-phase components of the samples, $Q(n)$ represents the quadrature components of the samples, and $n$ is a sample time index.

Each complex received sample can also be represented as a sum of the desired component and the impairment component, that is, $r(n)=s(n)+z(n)$, where $s(n)$ is a stream of desired signal components and $z(n)$ is a stream of impairment components, or noise. As noted above, the impairment component samples $z(n)$ may include interference from other signals, such as co-channel and adjacent channel interference and self-interference due to multipath propagation, and thermal or environmental noise. Often there are several interfering signals, with one being the strongest in power relative to the rest.

The receiver typically applies some form of baseband signal processing to the received sample stream $r(n)$ to recover (or "detect") the information symbols. Such baseband signal processing may be based on a model of the transmission medium. For example, the transmission medium may be modeled as a filter having K complex channel tap coefficients; the input to the filter is the transmitted digital signal and the output from the filter is the desired signal component. If $b(n)$ represents the transmitted digital signal, then the desired signal component samples $s(n)$ are given by:

$$s(n)=h(0)b(n)+h(1)b(n-1)+\ldots+h(K-1)b(n-K+1)$$

where $h(k)$ are the channel tap coefficients that are complex values having both real parts and imaginary parts. The channel tap coefficients may be expressed in polar representation by:

$$h(k)=a(k)e^{j\theta(k)}$$

where the amplitude of $h(k)$ is $a(k)$, which is the absolute value of $h(k)$. The phase of $h(k)$ is expressed as $\theta(k)$.

Estimates of the channel tap coefficients can be determined by various channel tap estimation techniques. Channel tap estimation, or channel tracking, is well known in the art and is discussed, for example, in J. Proakis, *Digital*

*Communications*, 2d ed., pp. 624-627 McGraw-Hill Book Co. (1989). Initial channel tap estimates can be obtained from synchronization-signal correlation values or least-squares estimation using known techniques.

Channel tap coefficient estimates $h_{est}(k)$ are used to calculate a detected digital symbol sequence $b_{det}(n)$. For example, if only $h_{est}(0)$ is non-zero (viz., if the medium is modeled by a filter having only one tap) and b(n) is binary, then $b_{det}(n)$ is given by:

$$b_{det}(n) = sgn[h_{est}(0)*r(n)]$$

where sgn[x] denotes taking the sign of x and superscript "*" denotes the complex conjugate. In this example, b(n) is binary so the allowable values of $b_{det}(n)$ are binary, e.g., +1 and −1. Thus, it can be seen that accurate detection of the transmitted digital signal b(n) is dependent on having accurate estimates of the channel tap coefficients.

This may be better understood by referring to FIG. 1, which illustrates a typical digital communication system 10 that includes a transmitter 12 and a receiver 14. Transmitter 12 includes a digital symbol generator 102 and a digital transmitter 103. Symbol generator 102 receives an information carrying signal 101 and generates a corresponding digital symbol sequence b(n). The digital symbol sequence b(n) is passed to digital transmitter 103, which subjects the sequence to digital-to-analog (D/A) conversion, modulation, pulse shaping, and amplification, and transmits the resulting analog signal Y. Receiver 14 comprises multiple receiver radio units 18a-18n, each of which may have a corresponding antenna 16a-16n, radio processor 105a-105n, and A/D converter 106a-106n. Each antenna 16a-16n receives an analog received signal corresponding to the transmitted signal Y and passes the received signal to a radio processor 105a-105n. Antennas 16a-16n may be spaced apart from one another, and accordingly, each radio unit 18a-18n receives a received signal from a different receive channel (space diversity).

In the example of FIG. 1, the channels are radio transmission channels, but those skilled in the art will appreciate that the channels may be telephone transmission channels, local area network transmission channels, etc. The channels may also be radio channels associated with phased array antenna elements or beams from a beam former. In addition, it should be understood that the separate antennas 16 and radio units 18 can be seen as the "fingers" of a rake receiver, which is a configuration typical of a remote terminal, e.g., a mobile telephone, in a modern digital cellular telephone system. This configuration provides multipath diversity.

Radio processors 105a-105n typically filter, amplify, and down-convert the received signal to base band. The baseband received signal is then converted by A/D converters 106a-106n into streams of complex digital received samples $r_x(n)$, where the subscript x indicates the receive channel corresponding to the sample stream. For example, radio unit 18a may receive an analog signal from antenna 16a and generate a corresponding digital received sample stream $r_a(n)$. The resulting digital signals $r_x(n)$ are sequences of complex samples having in-phase (I) and quadrature (Q) components. It will be understood by those skilled in the art, however, that the samples need not be complex. The complex samples $r_x(n)$ are provided to a baseband processor 20, which manipulates the complex samples using the estimated channel tap coefficients $h_{est}(k)$ to detect the information symbols, producing $b_{det}(n)$ from the received sample streams $r_x(n)$.

Multipath propagation is generally disadvantageous, since the self-interference signals are time dispersed and therefore able to interfere with one another and create interference fading. Multipath propagation can, however, also be of benefit. The reflected signals transmit the same information as the main signal. When fading has caused pronounced attenuation of the main signal itself, the main signal can be "reconstructed" or amplified by constructive addition of the time-dispersed rays, i.e., the signal becomes diversity amplified.

The baseband processor 20 includes a rake receiver. A rake receiver is a radio receiver which utilizes this feature of time dispersed signals beneficially. The rake receiver includes a plurality of independent receiver units, so-called rake branches, each of which receives and tracks, or locates, a respective ray. The rake receiver also includes means for combining the received signals, and means for delaying these signals so that they will be brought into phase prior to combining the signals.

If more than one channel tap coefficient is non-zero, then some form of equalization may be performed using channel tap coefficient estimates. One form of equalization is Maximum Likelihood Sequence Estimation (MLSE) equalization, which is described in chapter 6 of the book by J. Proakis that is cited above. Accordingly, the baseband processor 20 may include a coherent detector that may be implemented by a multi-antenna MLSE equalizer such as that disclosed in U.S. Pat. No. 5,191,598 to Backstrom et al., which is hereby expressly incorporated in this application by reference. It will be understood that the detected symbols may be further processed by the receiver. For example, forward error correction decoding may be performed on the detected symbols. The symbols may also be combined into soft information values.

Due to the effects of the transmission through the channel(s), the signals arriving at the antennas 16 include impairment signals, which include thermal noise and possibly interference signals as described above. An example of an interference signal is shown in FIG. 1 as signal X generated by interferer 106. The impairment signals make it difficult for the receiver to recover perfectly the information symbols from the received sample streams.

If the impairment component includes interference, then various interference rejection techniques can be applied to improve the signal to noise ratio (SNR) of the received signal and thereby improve the accuracy of the channel tap coefficient estimates. Interference rejection using array processing techniques can produce large performance gains in a digital transmission system, but for this kind of interference rejection to perform well, reasonable estimates of the channel tap coefficients of each separate channel are required. Examples of interference rejection techniques include those described in J. H. Winters, "Signal Acquisition and Tracking with Adaptive Arrays in the Digital Mobile Radio System IS-54 with Flat Fading", *IEEE Trans. Veh. Technol.*, vol. 42, pp. 377-384 (November 1993). Such techniques allow for good detection performance in the presence of large interference.

In a traditional communication system, each physical channel is tracked separately, which is to say that the channel tap coefficients of each physical channel are estimated independently, using each physical channel's received sample stream without reference to the received sample streams of other physical channels. Many known methods of estimating channel tap coefficients consider the channel tap coefficients as functions only of the signal received over the physical channel under consideration. Due to interference, accurately estimating each separate physical channel's channel tap coefficients may be difficult, leading to potential errors since the detector uses the estimated channel tap coefficients to detect the transmitted signal.

Each Base Station in a WCDMA system transmits on several physical channels. For several reasons, many of these physical channels contain pilot symbols that can be used to estimate channel properties. A pilot signal is typically one or more predetermined symbols that may be transmitted on its own channel or embedded in another channel and may be used for supervisory, control, equalization, continuity, synchronization, or reference purposes.

Referring again to FIG. 1, data generated in the transmitter 12 may contain, for example, channel encoded data, transmit power control (TPC) commands, optional transport format combination indicators (TFCIs) and the like. One such communication system is the third generation cellular telephone system that is being standardized by the Third Generation Partnership Project (3GPP). For downlink (base station to remote station) transmissions in 3GPP communication systems, the data may be space-time block encoded and may be rate matched, interleaved, and the like. One or more pilot signals may be multiplexed with the encoded data, and the multiplexed streams may be combined with channelization codes, scrambling codes, and the like. The channelized, scrambled signals are then transmitted by one or more antennas to the receiver 14.

FIG. 2 depicts an exemplary format of information carried by a transmission channel in the communication system of FIG. 1. As in many digital systems, the information carried by a channel is organized in a plurality of slots 210 that are grouped into a succession of frames 220, each of which includes a plurality of the slots 210. As shown in FIG. 2, the frames 220 may also be grouped into a succession of superframes 230. Each slot 210 may contain, among other information, a TFCI 211, a first group of data (payload) 212, a TPC command 213, a second group of data 214, and a pilot signal 215. In one exemplary communication system, slots may have durations of 0.625 millisecond (ms) and include variable numbers of bits, depending on the types of slots, frames may include sixteen slots, and superframes may include seventy-two frames. Every base station also transmits a CPICH that comprises pilot symbols with a spreading factor of 256. This CPICH is transmitted with relatively high power to reach the border of the cell.

Various approaches to channel estimation have been described. For example, U.S. Pat. No. 5,822,380 to G. Bottomley for "Apparatus and Method for Joint Channel Estimation" describes, among other things, an apparatus for estimating channel tap coefficients as functions of a received sample stream from a channel whose channel tap coefficients are being estimated and as functions of at least one other received sample stream from another channel. This patent is hereby expressly incorporated in this application by reference. U.S. patent application Ser. No. 09/573,157 filed on May 19, 2000, by J. Nilsson for "Method and Apparatus for Channel Estimation with Transmit Diversity" describes channel estimation using pilot signals in a transmit diversity environment. This patent application is hereby expressly incorporated in this application by reference.

European published patent application No. EP 0 955 741 to S. Abeta et al. for "Channel Estimating Apparatus, and CDMA Receiver and CDMA Transceiver Each Having the Apparatus" describes obtaining channel estimates of data symbols based on a pilot symbol sequence that is parallel to the data symbol sequence. U.S. Pat. No. 5,583,886 to K. Rohani et al. for "Method for Determining a Plurality of Channel Responses and Modifying a Received Signal Therewith" describes a frequency-hopping spread spectrum communication system that determines a plurality of channel estimates based on known signals transmitted from each of a plurality of transmitters.

FIG. 3 depicts a baseband processor 28 that handles multiple received channels as described in U.S. Pat. No. 5,822,380. As depicted in FIG. 3, baseband processor 28 includes a coherent detector 25, a joint channel estimator 30, and an impairment correlation estimator 32. Baseband processor 28 may be implemented in a programmable microprocessor or a digital signal processor (DSP) such as the model TMS320C50 manufactured by Texas Instruments.

The joint channel estimator 30 receives the complex sample streams $r_a(n)$ and $r_b(n)$ and an impairment correlation matrix $R_{zz}$, and estimates a set of channel tap coefficients h(k) for each of the receive channels based on both sample streams. By using the impairment correlation matrix and calculating the channel tap coefficients as a function of multiple complex sample streams, the impact of interference on the channel tap coefficient estimates is reduced. The joint channel estimator 30 also accepts as input known or tentatively detected values of $b_{det}(n)$, which are used by the joint channel estimator 30 to generate channel tap coefficient estimates.

The received sample streams $r_x(n)$ and the channel tap coefficients c(k) are provided to the impairment correlation estimator 32, which generates the impairment correlation matrix $R_{zz}$ for the receive antennas. The impairment correlation estimator 32 can be implemented in a variety of ways, including a method disclosed in U.S. Pat. No. 5,680,419 to Gregory E. Bottomley for "Method of and Apparatus for Interference Rejection Combining in Multi-Antenna Digital Cellular Communications Systems", which is hereby expressly incorporated in this application by reference. The impairment correlation matrix $R_{zz}$ is provided to joint channel estimator 30 and coherent detector 24 via line 41.

A switch 31 provides either known symbol values or tentatively detected information symbol values $b_{det}(n)$ to joint channel estimator 30 and impairment correlation estimator 32 via line 39. Known symbol values may be provided during synchronization or pilot signal processing, during which a known pattern of symbols is received and processed by the receiver. Following such processing, the switch provides detected information symbol values $b_{det}(n)$ to joint channel estimator 30 and impairment correlation estimator 32.

The coherent detector 25 receives the complex samples, the estimated channel tap coefficients and the impairment correlation information for multiple receive channels, and uses them to detect the transmitted information symbols. As indicated in FIG. 3, the coherent detector 25 may be adapted to perform interference cancellation by using the impairment correlation matrix $R_{zz}$ provided by impairment correlation estimator 32 to cancel or reject interference from the complex samples. An example of a suitable detector is described in U.S. Pat. No. 5,680,419. Another example of such a detector is described in the publication by J. H. Winters that is cited above.

The use of multiple received signals for estimating channel tap coefficients is complicated when the characteristics of the multiple received signals are too different. For example, errors occur when the received signals are derived from channels using different transmission powers, which is common in many modern communication systems. In a 3GPP system, dedicated and common channels are transmitted using different signals, which are often referred to as physical channels. The physical channels are separated by channelization codes and/or time-multiplexing. Depending on the configuration of the base station, these signals may, however, be transmitted through the same medium, thereby experiencing the same multipath. A DPCH and CPICH can be simultaneously received by a remote terminal, e.g., by different fingers of a rake receiver. The CPICH is broadcasted within each cell using a specific channelization code and always without power control. The power of the CPICH is chosen so that mobiles even outside the cell boundary can receive it. Thus, the power of the CPICH will in many cases be much higher than the power of DPCH's. Furthermore, the DPCH will in most cases be transmitted using power control, which is used to limit the power used by each individual DPCH to what is needed for each mobile to receive each DPCH. Thus, the transmission powers on each DPCH and the CPICH will in most cases differ by an amount unknown to the mobile. We refer to this difference as the gain offset. Note also that the gain offset will vary in time due to power control.

Accordingly, there is a need to provide more accurate channel tap coefficient estimates for multiple received channels and to combine channel estimates from multiple received channels having different transmit power levels in an optimal way.

SUMMARY

These and other needs are satisfied by Applicants' invention, which provides, in one aspect, a method of determining a gain offset between transmission channels in a communication system. A first set of channel estimates is derived from symbols received through a first channel and a second set of channel estimates is derived from symbols received through a second channel. The gain offset is determined at the receiver using a second-order equation based on the first and second sets of channel estimates.

In another aspect of Applicants' invention, a method of determining a set of complex channel estimates for a transmission channel in a communication system is provided. A first set of channel estimates is derived from symbols received through the transmission channel and a second set of channel estimates is derived from symbols received through a second channel in the communication system. A gain offset is determined based on the first and second sets of channel estimates. The set of channel estimate gains is determined based on the gain offset and the first and second sets of channel estimates.

In yet another aspect of Applicants' invention, a method of determining a set of channel estimate gains for a transmission channel in a communication system is provided. A first set of channel estimates is derived from symbols received through the transmission channel and a second set of channel estimates is derived from symbols received through a second channel in the communication system. A gain offset is determined based on the first and second sets of channel estimates. A set of channel estimate gains is determined based on the gain offset and the first and second sets of channel estimates. The set of channel estimate gains are associated with channel estimate phases of one of the first and second sets of channel estimates.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

The objects, features, and advantages of this invention will be understood by reading this description in conjunction with the drawings, in which like reference numerals identify like parts and in which:

FIG. 4A is a flowchart of methods in accordance with the invention;

FIG. 4B is a block diagram of methods in accordance with the invention;

FIG. 5 is a block diagram of a rake receiver and processing unit according to the invention;

FIG. 6A is a block diagram of the functions of the processor unit of FIG. 5 according to an embodiment of the invention.

DETAILED DESCRIPTION

Figure 1:
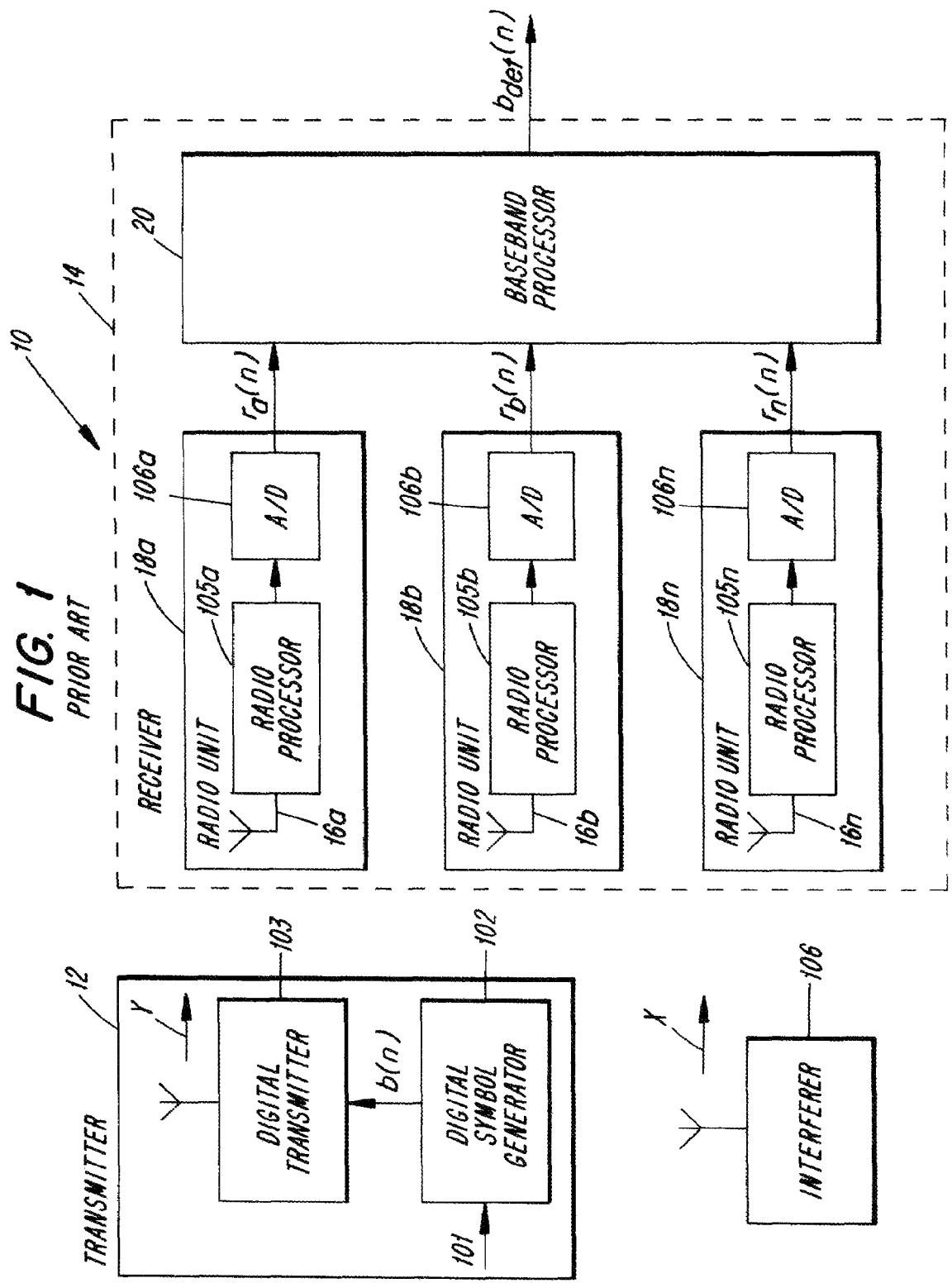
FIG. 1 is a block diagram of a typical digital communication system.
Figure 2:
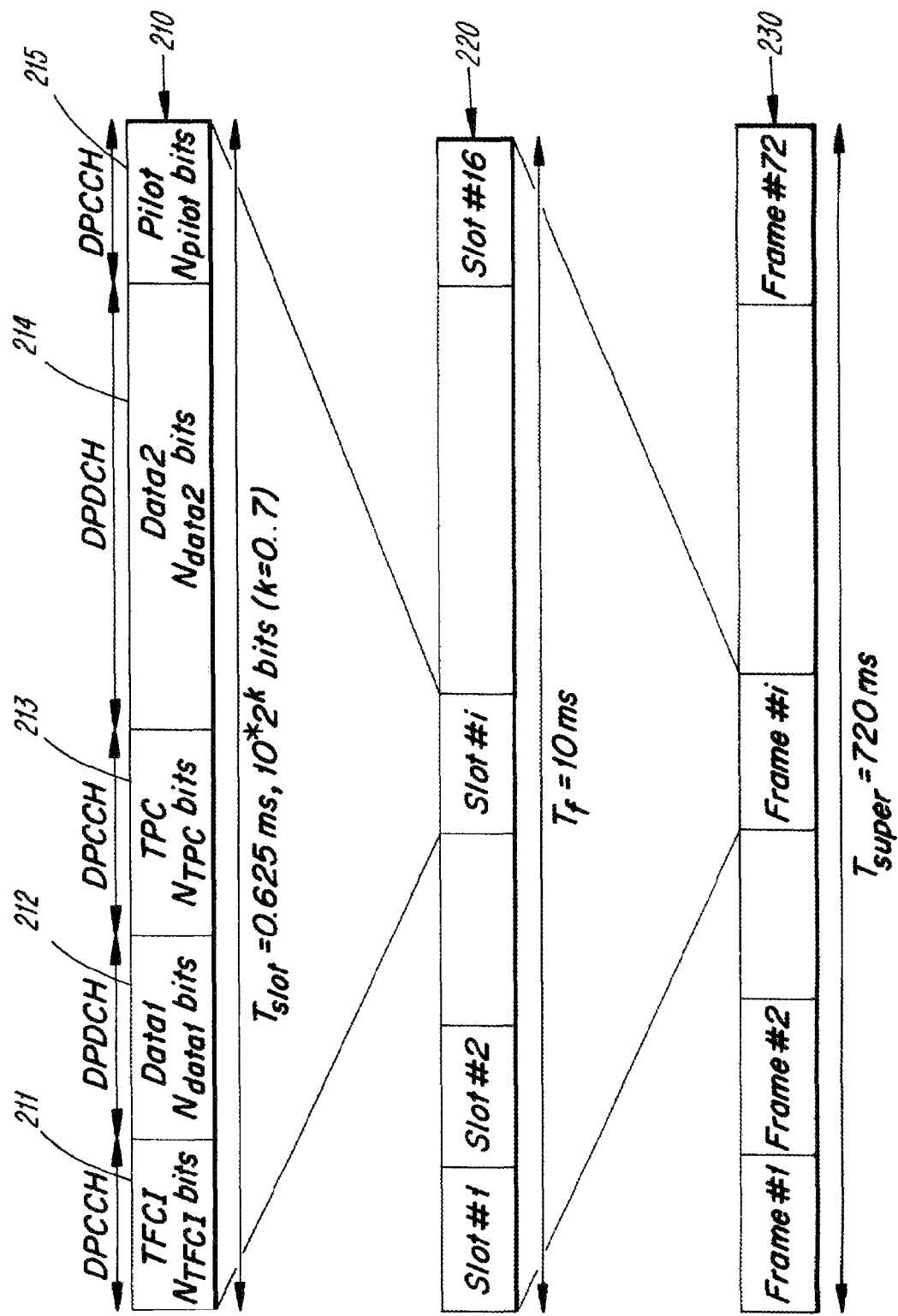
FIG. 2 depicts a format of transmission channel.

Some modern digital communication systems such as those described in the patents and publications cited above use rake receivers to handle reflections, or echoes, of a transmitted signal that travel different paths and arrive at the receiving antenna at different times. A rake receiver may be thought of as having a plurality of "fingers", and each finger may be thought of as a separate receiver for a respective signal path. To improve performance, the outputs of the rake fingers are often combined through a process of maximum ratio combining, and more accurate channel estimates improve the accuracy of such maximum ratio rake combining and the accuracy of the eventual detected symbols.

Typically, channel estimates are derived from pilot symbols included in the transmitted signal, but data symbols and other known symbols may also be used. In the 3GPP standard, two channels have pilot symbols that are suitable for channel estimation when receiving dedicated channels, the DPCH and the CPICH, as described in "Physical Channels and Mapping of Transport Channels onto Physical Channels (FDD)", 3G TS 25.211 ver. 3.3.0 (June 2000). The two channels have, however, different properties, one of which is that the channels are sent at different powers. The power offset can also change over time due to the transmission power control that is used on the DPCH. Thus, the receiver generally does not have accurate knowledge of the gain offset, although correcting for this power offset is important to get correct soft information for decoders that follow the rake receiver. A communication system could send the receiver messages that specify the gain offset, but doing so would be undesirable because the messages would consume scarce channel capacity and, even more, would not necessarily be correctly received.

Combining channel estimates from the DPCH and CPICH without correcting for the gain offset between the channels could be done, of course. For example, one method would use channel estimates derived from the CPICH as channel estimates for the DPCH, but this would give incorrect soft information for the DPCH for reasons noted above. Another method would generate "hybrid" channel estimates, using gain information from DPCH channel estimates and phase information from CPICH channel estimates. (Recall that the channel estimates are complex quantities.) In principle, this method would give correct behavior, but channel estimates derived from the DPCH are normally noisier than channel estimates derived from the CPICH due to the different power levels of the DPCH and CPICH, and so the accuracy improvement obtainable by this method would be limited. Accordingly, an optimal way to combine channel estimates from two channels, such as the CPICH and the DPCH, that does not require additional messages to specify a gain offset between the channels is described. The following is a mathematical derivation of Applicants' method of determining the gain offset between two channels and improved method of channel estimation, which are illustrated by the flowchart in FIG. 4A and block diagram of FIG. 4B.

Let the channel estimates $\hat{h}_i$ corresponding to a rake finger $i \in [1, n]$ be given by the following expression (steps 402, 404):

$$\hat{h}_i^D = h_i + e_i \quad (1)$$

$$\hat{h}_i^C = g h_i + v_i \quad (2)$$

for the DPCH and CPICH, respectively, where $h_i$ represents the noiseless channel estimates, $e_i$ and $v_i$ represent noise, g is a real number representing the gain offset between the two channels, which are indicated by the superscripts D and C. Further, let the noise be uncorrelated, zero-mean, complex Gaussian-distributed with variances $\sigma_{ei}^2$, $\sigma_{vi}^2$, respectively.

The maximum-likelihood solution for the channel estimates is the set $\theta = \{h_1, \ldots, h_n, g\}$ that fulfills the following conditional probability relation:

$$\max_\theta p(Y \mid \theta) \quad (3)$$

where the observation set Y is given by the channel estimates for all fingers:

$$Y = \{\hat{h}_1^C, \ldots, \hat{h}_n^C, \hat{h}_1^D, \ldots, \hat{h}_n^D\} \quad (4)$$

The conditional probability function $p(Y|\theta)$ is given by the following expression:

$$p(Y|\theta) = \frac{1}{(2\pi)^n \prod_{i=1}^n \sigma_{ei}\sigma_{vi}} \prod_{i=1}^n e^{-\frac{|\hat{h}_i^D - h_i|^2}{2\sigma_{ei}^2}} \prod_{i=1}^n e^{-\frac{|\hat{h}_i^C - g h_i|^2}{2\sigma_{vi}^2}} \quad (5)$$

and the corresponding log-probability function log $p(Y|\theta)$ is given by:

$$\log p(Y|\theta) = \log\left(\frac{1}{(2\pi)^n \prod_{i=1}^n \sigma_{ei}\sigma_{vi}}\right) - \sum_{i=1}^n \frac{|\hat{h}_i^D - h_i|^2}{2\sigma_{ei}^2} - \sum_{i=1}^n \frac{|\hat{h}_i^C - g h_i|^2}{2\sigma_{vi}^2} \quad (6)$$

To maximize the conditional probability function, it is useful to set that function's derivative equal to zero. The partial derivative of the log-probability function with respect to channel h and the partial derivative of the log-probability function with respect to the gain offset g respectively form the following expressions:

$$\frac{\delta \log p(Y|\theta)}{\delta \bar{h}_i} = \frac{\hat{h}_i^D - h_i}{\sigma_{ei}^2} + \frac{g(\hat{h}_i^C - g h_i)}{\sigma_{vi}^2} \quad (7)$$

$$\frac{\delta \log p(Y|\theta)}{\delta g} = \sum_{i=1}^n \text{Re}\left(\frac{h_i(\hat{h}_i^C - g h_i)}{\sigma_{vi}^2}\right) \quad (8)$$

where $\bar{h}_i$ denotes the complex conjugate of $h_i$.

Setting the derivatives in Equations (7) and (8) equal to zero yields the following maximum likelihood (ML) estimates $\{h_i^{ML}, g^{ML}\}$:

$$h_i^{ML} = \frac{\sigma_{vi}^2 \hat{h}_i^D + \sigma_{ei}^2 \hat{h}_i^C g^{ML}}{\sigma_{vi}^2 + \sigma_{ei}^2 (g^{ML})^2} \quad (9)$$

where the gain offset $g^{ML}$ is the solution of the following equation:

$$\sum_{i=1}^n \text{Re}\left(\frac{(\sigma_{vi}^2 \hat{h}_i^D + \sigma_{ei}^2 \hat{h}_i^C g^{ML})(\hat{h}_i^C - \hat{h}_i^D g^{ML})}{(\sigma_{vi}^2 + \sigma_{ei}^2 (g^{ML})^2)^2}\right) = 0 \quad (10)$$

It will be recognized that equation (10) for the general case is a polynomial equation of order 4n−2. Such an equation is difficult to solve if n is greater than one, which is the case in communication systems that seek accurately to estimate the impulse responses of their transmission channels.

Applicants have recognized that the general expression can be simplified and that equation (10) for the general case can be readily solved for the case of a rake receiver having many fingers or its equivalent.

One assumption that eases solution of equation (10) is to assume that the noise power (interference) seen on the two channels is related as:

$$\sigma_{vi}^2 = \alpha \sigma_{ei}^2 \quad (11)$$

where α is a scale factor. In a communication system that uses spread spectrum techniques, the observed noise is related to the amount of spreading (processing gain) employed on the different channels, and in a 3GPP communication system the amount of spreading can be different on different channels as described in "Spreading and Modulation (FDD)", 3G TS 25.213 ver. 3.0.0 (October 1999). Thus, the scale factor $\alpha = (sf/256)(n_D/n_C)$, where sf is the spreading factor used for the symbols of the DPCH, 256 is the spreading factor used for the symbols of CPICH, and $n_D$ and $n_C$ are, respectively, the numbers of symbols coherently summed to get the DPCH channel estimates $\hat{i}^D$ and the CPICH channel estimates $\hat{i}^C$. The noise variance is a parameter that is estimated by the receiver, in particular a receiver in a 3GPP communication that is required periodically to report that parameter or parameters related to it and the spreading factor is also known by the receiver through messages sent on the different channels.

It will be understood that the probability function of equation (5) assumes that the two channels have independent channel estimation errors $v_i$, $e_i$, which is a valid assumption for many communication systems, in particular for a 3GPP system in which different (orthogonal) spreading sequences are used for the DPCH and CPICH. With this assumption, equation (10) can be rewritten as follows:

$$\sum_{i=1}^{n} \text{Re}\left(\frac{(\alpha \hat{h}_i^D + \hat{h}_i^C g^{ML})(\overline{\hat{h}_i^C - \hat{h}_i^D g^{ML}})}{\sigma_{ei}^2}\right) = 0 \quad (12)$$

which can be recognized as a second-order equation in the gain offset $g^{ML}$ as follows:

$$(g^{ML})^2 + \beta g^{ML} - \alpha = 0 \quad (13)$$

where $\alpha$ is as described above and $\beta$ is calculated (450) as follows:

$$\beta = \frac{\sum_{i=1}^{n} \frac{\alpha|\hat{h}_i^D|^2 - |\hat{h}_i^C|^2}{\sigma_{ei}^2}}{\sum_{i=1}^{n} \text{Re}\left(\frac{\overline{\hat{h}_i^C} \hat{h}_i^D}{\sigma_{ei}^2}\right)} \quad (14)$$

The quadratic equation (13) can be solved by simple substitution (460) into the following expression:

$$g^{ML} = -\frac{\beta}{2} + \sqrt{\frac{\beta^2}{4} + \alpha}, \quad (15)$$

where the positive root may be chosen such that the gain offset g is conveniently greater than zero. It will be appreciated that the negative root may be used instead with appropriate adjustments. Thus, the gain offset between the two channels, which is generally unknown to the receiver, can be determined (step 406) by the receiver from channel estimates derived independently from each channel (steps 402, 404).

Moreover, with the assumptions described above, equation (9) can be written as follows:

$$h_i^{ML} = \frac{\alpha \hat{h}_i^D + g^{ML} \hat{h}_i^C}{\alpha + (g^{ML})^2} \quad (16)$$

which yields (step 408) the optimal channel estimates that should be used in the receiver or rake combiner (see equation (1)). Thus, a linear combination (470) of the channel estimates is determined based on the gain offset to provide the complex channel estimate.

The complex channel estimates $h^{ML}$ together with the gain offset g contain all the necessary amplitude and phase information. An alternative solution that separates the gain and phase estimations is also possible. The phases are then obtained by other means. The associated phases can be, for instance, the phases from the channel estimates already derived from one of the channels. It is currently believed preferable to use the channel estimate phases derived from the higher-power channel, which normally have less noise than the channel estimates from the lower-power channel. In a 3GPP communication system, the phases of the CPICH, which is normally transmitted at higher power than the DPCH as noted above, would preferably be used. It is also possible to use a combination of channel estimates.

Figure 3:
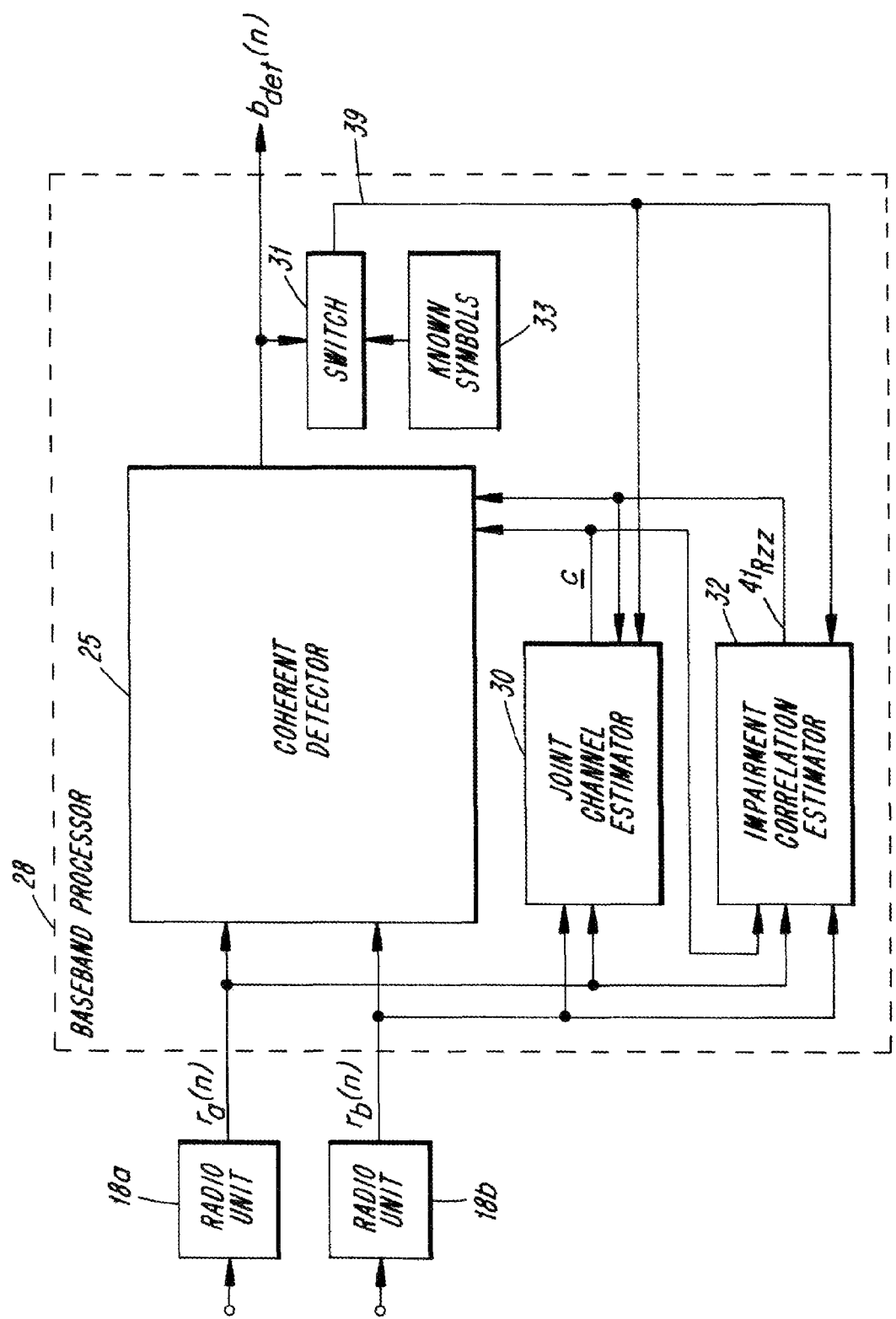
FIG. 3 is a block diagram of a baseband processor.

It will be appreciated that the steps of the methods illustrated in FIG. 4 can be readily implemented either by software that is executed by a suitable processor in a receiver or a baseband processor 28 such as that depicted in FIG. 3 or by hardware, such as an application-specific integrated circuit (ASIC), provided in the receiver or baseband processor. The receiver or baseband processor may be used within, for example, a mobile phone or other portable radio device within a communication system.

The scope of the invention is not limited to any particular digital communication system or standard. To better understand some of the advantages of the invention, an example of how the invention may be used in 3GPP WCDMA digital communication systems is described below with reference to FIGS. 5 and 6.

Since the CPICH and DPCH are transmitted through the same physical medium, they experience the same multipath and differ by the gain offset. Thus, with reference to FIG. 5, each of the fingers 1 to n (501, 502, ... 50n) of a rake receiver receive the CPICH and DPCH with the same gain difference between them. The invention uses the information obtained from all fingers (501, 502, ... 50n) to estimate accurately the gain offset. This function is performed by a processing unit 510, which obtains the information from each of the fingers and instructs a combiner 520 how to best combine the signals received via the fingers. In this way, the gain offset estimation is improved as compared to estimating this information using only one finger.

In the rake receiver 500, both the CPICH and the DPCH are despread for each multipath component using the different fingers (501, 502, ... 50n) of the rake. The despread information symbols from the DPCH are derotated within the combiner 520 under the control of processing unit 510, which uses the corresponding known pilot symbols to obtain the channel estimates $\hat{h}_i^D$ and $\hat{h}_i^C$, for i=1 ... N. Several despread, derotated symbols may be averaged in order to reduce the variance of these channel estimates.

The processing unit 510, uses all, or some subset of, the channel estimates $\hat{h}_i^D$ and $\hat{h}_i^C$, for i=1 ... N, to derive a second set of channel estimated, $h_i$, for i=1 ... N.

The processing unit 510 may be implemented using a programmable digital signal processor (DSP) or any other processor, or an ASIC. The functions of the processing unit 510, working in conjunction with the combiner 520, are illustrated with reference to FIG. 6A. The processing unit 510 first receives the despread pilot symbols for the dedicated channel and common channel for all fingers (601, 602, 60n). The pilot symbols are derotated 610 and filtered 620. The signals are processed and linearly combined to calculate 690 a complex channel estimate as illustrated in FIG. 4B.

Figure 6B:
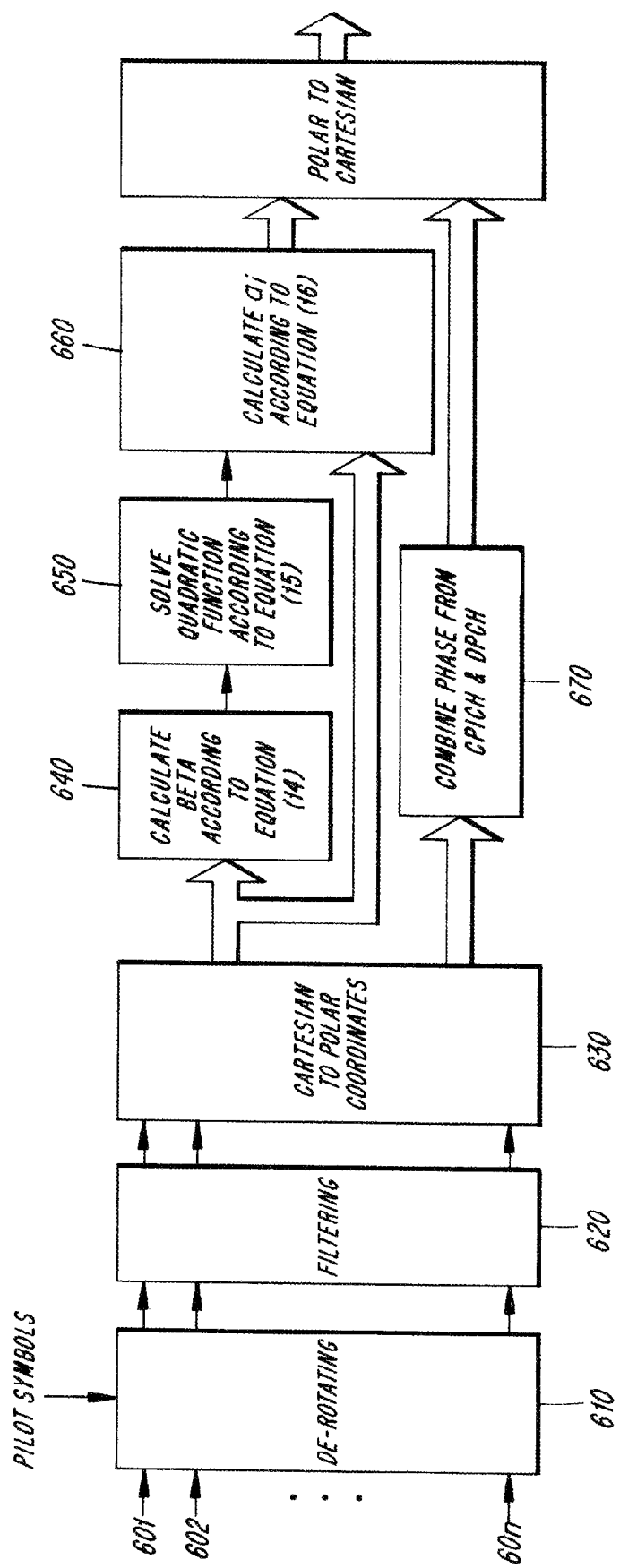
FIG. 6B is a block diagram of the functions of the processor unit of FIG. 5 according to an alternative embodiment of the invention.

The alternative solution that separates the gain and phase estimations is illustrated with reference to FIG. 6B. The pilot symbols are derotated 610, filtered 620, and converted to polar representation 630. The amplitude of the signals $\hat{\alpha}_i^D$ and $\hat{\alpha}_i^C$ for i=1 ... N, of the signals, $\hat{h}_i^D$ and $\hat{h}_i^C$ further. The parameter β is calculated 640 using equation (14), g is derived 650 using equation (15), and $a_i$ is calculated 660 using equation (16), for all i=1 . . . N. The phase of each channel estimate, and may be combined 670, or the phase may be taken directly from $\hat{h}_i^C$. The channel estimate may then be generated as:

$$h_i = \alpha_i e^{j\theta_i} \quad (17)$$

The method of the invention combines information from more that one finger to establish a first set of channel estimates, which are used to derive a second, more accurate, set of channel estimates, thereby improving system performance.

Various embodiments of Applicants' invention have been described, but it will be appreciated by those of ordinary skill in this art that these embodiments are merely illustrative and that many other embodiments are possible. The intended scope of the invention is set forth by the following claims, rather than the preceding description, and all variations that fall within the scope of the claims are intended to be embraced therein.

What is claimed is:

1. A method in a receiver of determining a gain offset between transmission channels in a communication system, comprising the steps of:
   receiving a first signal transmitted through a first channel in the communication system;
   receiving a second signal transmitted through a second channel in the communication system;
   deriving a first set of channel estimates from samples derived from the first signal;
   deriving a second set of channel estimates from samples derived from the second signal; and
   determining the gain offset based on the first and second sets of channel estimates,
   wherein each of the channel estimates is a model of a respective one of the first and second channels, and includes one or more channel tap coefficients.

2. The method of claim 1, wherein the first and second channels are pilot channels.

3. The method of claim 1, wherein the first and second channels are a Dedicated Physical Channel (DPCH) and a Common Physical Pilot Channel (CPICH), respectively, in a Wideband Code Division Multiple Access (WCDMA) system.

4. A method in a receiver of determining a set of complex channel estimates for a transmission channel in a communication system, comprising the steps of:
   receiving a first signal transmitted through the transmission channel;
   receiving a second signal transmitted through a second transmission channel;
   deriving a first set of channel estimates from samples derived from the first signal;
   deriving a second set of channel estimates from samples derived from the second signal;
   determining a gain offset based on the first and second sets of channel estimates; and
   determining the set of complex channel estimates based on the gain offset and the first and second sets of channel estimates,
   wherein:
   each of the channel estimates in the first set of channel estimates is a model of the transmission channel, and includes one or more channel tap coefficients; and
   each of the channel estimates in the second set of channel estimates is a model of the second channel, and includes one or more channel tap coefficients.

5. The method of claim 4, wherein the gain offset is determined using a second-order equation.

6. The method of claim 4, wherein the gain offset $g^{ML}$ is determined using the following equation:

$$g^{ML} = -\frac{\beta}{2} + \sqrt{\frac{\beta^2}{4} + \alpha},$$

where:

$$\beta = \frac{\sum_{i=1}^{n} \frac{\alpha|\hat{h}_i^D|^2 - |\hat{h}_i^C|^2}{\sigma_{ei}^2}}{\sum_{i=1}^{n} \text{Re}\left(\frac{\overline{\hat{h}_i^C}\hat{h}_i^D}{\sigma_{ei}^2}\right)}$$

α is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$, and $\sigma_{ei}^2$ is an estimated noise variance parameter.

7. The method of claim 6, wherein the complex channel estimate $h_i^{ML}$ is determined using the following equation:

$$h_i^{ML} = \frac{\alpha \hat{h}_i^D + g^{ML}\hat{h}_i^C}{\alpha + (g^{ML})^2}$$

where: α is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$.

8. The method of claim 6, wherein the complex channel estimate is determined by performing a linear combination of the first and second set of channel estimates based on the gain offset.

9. A method in a receiver of determining a set of complex channel estimates for a transmission channel in a communication system, comprising the steps of:
   receiving a first signal transmitted through the transmission channel;
   receiving a second signal transmitted through a second transmission channel;
   deriving a first set of channel estimates from samples derived from the first signal;
   deriving a second set of channel estimates from samples derived from the second signal;
   determining a gain offset based on the first and second sets of channel estimates; and
   determining the set of complex channel estimates based on the gain offset and the first and second sets of channel estimates, wherein the gain offset $g^{ML}$ is determined using the following equation:

$$g^{ML} = -\frac{\beta}{2} + \sqrt{\frac{\beta^2}{4} + \alpha},$$

where:

$$\beta = \frac{\sum_{i=1}^{n} \frac{\alpha|\hat{h}_i^D|^2 - |\hat{h}_i^C|^2}{\sigma_{ei}^2}}{\sum_{i=1}^{n} \text{Re}\left(\frac{\hat{h}_i^C \hat{h}_i^D}{\sigma_{ei}^2}\right)}$$

$\alpha$ is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$, and $\sigma_{ei}^2$ is an estimated noise variance parameter.

10. The method of claim 9, wherein the complex channel estimate $h_i^{ML}$ is determined using the following equation:

$$h_i^{ML} = \frac{\alpha \hat{h}_i^D + g^{ML} \hat{h}_i^C}{\alpha + (g^{ML})^2}$$

where: $\alpha$ is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$.

11. The method of claim 9, wherein the complex channel estimate is determined by performing a linear combination of the first and second set of channel estimates based on the gain offset.

12. A method in a receiver of determining a set of channel estimate gains for a transmission channel in a communication system, comprising the steps of:
  receiving a first signal transmitted through the transmission channel;
  receiving a second signal transmitted through a second transmission channel;
  deriving a first set of channel estimates from samples derived from the first signal;
  deriving a second set of channel estimates from samples derived from the second signal;
  determining a gain offset based on the first and second sets of channel estimates;
  determining a set of channel estimate gains based on the gain offset and the first and second sets of channel estimates; and
  associating the set of channel estimate gains with channel estimate phases of one of the first and second sets of channel estimates, wherein:
  each of the channel estimates in the first set of channel estimates is a model of the transmission channel, and includes one or more channel tap coefficients; and
  each of the channel estimates in the second set of channel estimates is a model of the second channel, and includes one or more channel tap coefficients.

13. The method of claim 12, wherein the associated channel estimate phase is the one of the first and second sets of channel estimates being from a high-power channel.

14. The method of claim 13, wherein the associated channel estimate phase is the one of the first and second sets of channel estimates being from a Dedicated Physical Channel (DPCH) channel in a Wideband Code Division Multiple Access (WCDMA) system.

15. An apparatus in a receiver for determining a gain offset between transmission channels in a communication system, the apparatus comprising:
  means for receiving a first signal transmitted through a first channel in the communication system;
  means for receiving a second signal transmitted through a second channel in the communication system;
  means for deriving a first set of channel estimates from samples derived from the first signal;
  means for deriving a second set of channel estimates from samples derived from the second signal; and
  means for determining the gain offset based on the first and second sets of channel estimates,
  wherein each of the channel estimates is a model of a respective one of the first and second channels, and includes one or more channel tap coefficients.

16. The apparatus of claim 15, wherein the first and second channels are pilot channels.

17. The apparatus of claim 15, wherein the first and second channels are a Dedicated Physical Channel (DPCH) and a Common Physical Pilot Channel (CPICH), respectively, in a Wideband Code Division Multiple Access (WCDMA) system.

18. An apparatus in a receiver for determining a set of complex channel estimates for a transmission channel in a communication system, the apparatus comprising:
  means for receiving a first signal transmitted through the transmission channel;
  means for receiving a second signal transmitted through a second transmission channel;
  means for deriving a first set of channel estimates from samples derived from the first signal;
  means for deriving a second set of channel estimates from samples derived from the second signal;
  means for determining a gain offset based on the first and second sets of channel estimates; and
  means for determining the set of complex channel estimates based on the gain offset and the first and second sets of channel estimates,
  wherein:
  each of the channel estimates in the first set of channel estimates is a model of the transmission channel, and includes one or more channel tap coefficients; and
  each of the channel estimates in the second set of channel estimates is a model of the second channel, and includes one or more channel tap coefficients.

19. The apparatus of claim 18, wherein the gain offset is determined using a second-order equation.

20. The apparatus of claim 18, wherein the gain offset $g^{ML}$ is determined using the following equation:

$$g^{ML} = -\frac{\beta}{2} + \sqrt{\frac{\beta^2}{4} + \alpha},$$

where:

$$\beta = \frac{\sum_{i=1}^{n} \frac{\alpha|\hat{h}_i^D|^2 - |\hat{h}_i^C|^2}{\sigma_{ei}^2}}{\sum_{i=1}^{n} \text{Re}\left(\frac{\overline{\hat{h}_i^C} \hat{h}_i^D}{\sigma_{ei}^2}\right)}$$

$\alpha$ is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$, and $\sigma_{ei}^2$ is an estimated noise variance parameter.

21. The apparatus of claim 20, wherein the complex channel estimate $h_i^{ML}$ is determined using the following equation:

$$h_i^{ML} = \frac{\alpha \hat{h}_i^D + g^{ML}\hat{h}_i^C}{\alpha + (g^{ML})^2}$$

where: $\alpha$ is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$.

22. The apparatus of claim 20, wherein the complex channel estimate is determined by performing a linear combination of the first and second set of channel estimates based on the gain offset.

23. An apparatus in a receiver for determining a set of complex channel estimates for a transmission channel in a communication system, the apparatus comprising:
  means for receiving a first signal transmitted through the transmission channel;
  means for receiving a second signal transmitted through a second transmission channel;
  means for deriving a first set of channel estimates from samples derived from the first signal;
  means for deriving a second set of channel estimates from samples derived from the second signal;
  means for determining a gain offset based on the first and second sets of channel estimates; and
  means for determining the set of complex channel estimates based on the gain offset and the first and second sets of channel estimates, wherein the gain offset $g^{ML}$ is determined using the following equation:

$$g^{ML} = -\frac{\beta}{2} + \sqrt{\frac{\beta^2}{4} + \alpha},$$

where:

$$\beta = \frac{\sum_{i=1}^{n} \frac{\alpha|\hat{h}_i^D|^2 - |\hat{h}_i^C|^2}{\sigma_{ei}^2}}{\sum_{i=1}^{n} \text{Re}\left(\frac{\overline{\hat{h}_i^C} \hat{h}_i^D}{\sigma_{ei}^2}\right)}$$

$\alpha$ is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$, and $\sigma_{ei}^2$ is an estimated noise variance parameter.

24. The apparatus of claim 23, wherein the complex channel estimate $h_i^{ML}$ is determined using the following equation:

$$h_i^{ML} = \frac{\alpha \hat{h}_i^D + g^{ML}\hat{h}_i^C}{\alpha + (g^{ML})^2}$$

where: $\alpha$ is a scale factor based on a spreading factor such that $\alpha=(sf/256)(n_D/n_C)$, where sf is the spreading factor used for symbols of the transmission channel, 256 is the spreading factor used for symbols of the second channel, and $n_D$ and $n_C$ are, respectively, the numbers of symbols coherently summed to get the first set of channel estimates $\hat{h}_i^D$ and the second set of channel estimates $\hat{h}_i^C$.

25. The apparatus of claim 23, wherein the complex channel estimate is determined by performing a linear combination of the first and second set of channel estimates based on the gain offset.

26. An apparatus in a receiver for determining a set of channel estimate gains for a transmission channel in a communication system, the apparatus comprising:
  means for receiving a first signal transmitted through the transmission channel;
  means for receiving a second signal transmitted through a second transmission channel;
  means for deriving a first set of channel estimates from samples derived from the first signal;
  means for deriving a second set of channel estimates from samples derived from the second signal;
  means for determining a gain offset based on the first and second sets of channel estimates;
  means for determining a set of channel estimate gains based on the gain offset and the first and second sets of channel estimates; and
  means for associating the set of channel estimate gains with channel estimate phases of one of the first and second sets of channel estimates, wherein:
  each of the channel estimates in the first set of channel estimates is a model of the transmission channel, and includes one or more channel tap coefficients; and each of the channel estimates in the second set of channel estimates is a model of the second channel, and includes one or more channel tap coefficients.

27. The apparatus of claim 26, wherein the associated channel estimate phase is the one of the first and second sets of channel estimates being from a high-power channel.

28. The apparatus of claim 27, wherein the associated channel estimate phase is the one of the first and second sets of channel estimates being from a Dedicated Physical Channel (DPCH) channel in a Wideband Code Division Multiple Access (WCDMA) system.

* * * * *